US011860560B2

(12) United States Patent
Tachi

(10) Patent No.: US 11,860,560 B2
(45) Date of Patent: Jan. 2, 2024

(54) IMAGE FORMING APPARATUS AND IMAGE FORMING METHOD

(71) Applicant: Masashi Tachi, Kanagawa (JP)

(72) Inventor: Masashi Tachi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/155,312

(22) Filed: Jan. 17, 2023

(65) Prior Publication Data

US 2023/0280687 A1 Sep. 7, 2023

(30) Foreign Application Priority Data

Mar. 7, 2022 (JP) ................................ 2022-034249
Nov. 9, 2022 (JP) ................................ 2022-179246

(51) Int. Cl.
*G03G 15/00* (2006.01)
*G03G 15/16* (2006.01)

(52) U.S. Cl.
CPC ..... *G03G 15/5041* (2013.01); *G03G 15/1615* (2013.01); *G03G 15/5054* (2013.01); *G03G 15/5058* (2013.01); *G03G 2215/00042* (2013.01)

(58) Field of Classification Search
CPC ........... G03G 15/1615; G03G 15/5041; G03G 15/5054; G03G 15/5058; G03G 2215/00042
See application file for complete search history.

(56) References Cited

U.S. PATENT DOCUMENTS

2011/0110676 A1* 5/2011 Higa .................. G03G 15/5062 399/49
2016/0091816 A1* 3/2016 Kochi ................ G03G 15/0131 399/66
2016/0259275 A1* 9/2016 Iwakawa ............ G03G 15/5008
2018/0143581 A1 5/2018 Nakayama et al.
2019/0064719 A1 2/2019 Tachi et al.
2021/0318651 A1 10/2021 Tachi et al.

FOREIGN PATENT DOCUMENTS

JP 2010-256740 11/2010
JP 2014-056124 3/2014
JP 2014-092732 5/2014
JP 2018-194654 12/2018

* cited by examiner

*Primary Examiner* — Joseph S Wong
(74) *Attorney, Agent, or Firm* — IPUSA, PLLC

(57) ABSTRACT

An image forming apparatus includes an image forming device, a first transfer device including a first mover, a second transfer device including a second mover, a transfer-pressure changer, a detector, and circuitry. The detector detects a toner image and outputs a detection value indicating an amount of toner of the toner image adhering to the second mover. The circuitry calculates a variable value for the amount of toner varying with a change in a transfer pressure, based on the detection value and a target value of the amount of toner of the toner image to be transferred and adhere to the second mover, reflects the calculated variable value in the detection value to correct the detection value, adjusts an image-forming condition based on the corrected detection value, and sets the image-forming condition of the toner image in the image forming device based on the corrected detection value.

5 Claims, 7 Drawing Sheets

IMAGE FORMING APPARATUS AND IMAGE FORMING METHOD

CROSS-REFERENCE TO RELATED APPLICATIONS

This patent application is based on and claims priority pursuant to 35 U.S.C. § 119(a) to Japanese Patent Application Nos. 2022-034249, filed on Mar. 7, 2022, and 2022-179246, filed on Nov. 9, 2022, in the Japan Patent Office, the entire disclosure of each of which is hereby incorporated by reference herein.

BACKGROUND

Technical Field

Embodiments of the present disclosure relate to an image forming apparatus and an image forming method.

Related Art

An image forming apparatus in the background art includes an image forming device, an image density sensor, and a controller. The image forming device includes a photoconductor and a developing device. The image density sensor detects, as an image density, the density of an image formed by the image forming device. The controller corrects a target value of a control parameter, which influences the developing ability of the image forming device, with a correction amount obtained by a given algorithm. The controller also corrects the algorithm based on the image density detected by the image density sensor.

Such an image forming apparatus may convey recording media at high speed. In this case, the transfer pressure at the secondary transfer nip has to be changed in sheet interval, in other words, between the preceding recording medium and the succeeding recording medium, to prevent the reduction of the productivity of the image forming apparatus.

SUMMARY

According to an embodiment of the present disclosure, a novel image forming apparatus includes an image forming device, a first transfer device, a second transfer device, a transfer-pressure changer, an adhesion-amount detector, and circuitry. The image forming device includes an image bearer to form a toner image on the image bearer. The first transfer device includes a first mover to transfer the toner image from the image bearer onto the first mover. The second transfer device includes a second mover to transfer the toner image from the first mover onto the second mover. The transfer-pressure changer changes a transfer pressure of the second mover against the first mover. The adhesion-amount detector detects the toner image transferred onto the second mover and outputs a detection value indicating an amount of toner of the toner image adhering to the second mover. The circuitry calculates a variable value for the amount of toner of the toner image adhering to the second mover based on the detection value and a target value of the amount of toner of the toner image to be transferred and adhere to the second mover. The variable value varies with a change in the transfer pressure. The circuitry reflects the calculated variable value in the detection value to correct the detection value. The circuitry adjusts an image-forming condition based on the corrected detection value. The circuitry sets the image-forming condition of the toner image in the image forming device based on the corrected detection value.

Also described is a novel method for forming an image. The method includes forming a toner image on an image bearer of an image forming device, transferring the toner image from the image bearer onto a first mover, transferring the toner image from the first mover onto a second mover, changing a transfer pressure of the second mover against the first mover, detecting the toner image transferred onto the second mover and outputting a detection value indicating an amount of toner of the toner image adhering to the second mover, and setting an image-forming condition of the toner image in the image forming device based on the detection value. The setting includes calculating a variable value for the amount of toner of the toner image adhering to the second mover based on the detection value and a target value of the amount of toner of the toner image to be transferred and adhere to the second mover, the variable value varying with a change in the transfer pressure, reflecting the calculated variable value in the detection value to correct the detection value, and adjusting the image-forming condition based on the corrected detection value.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
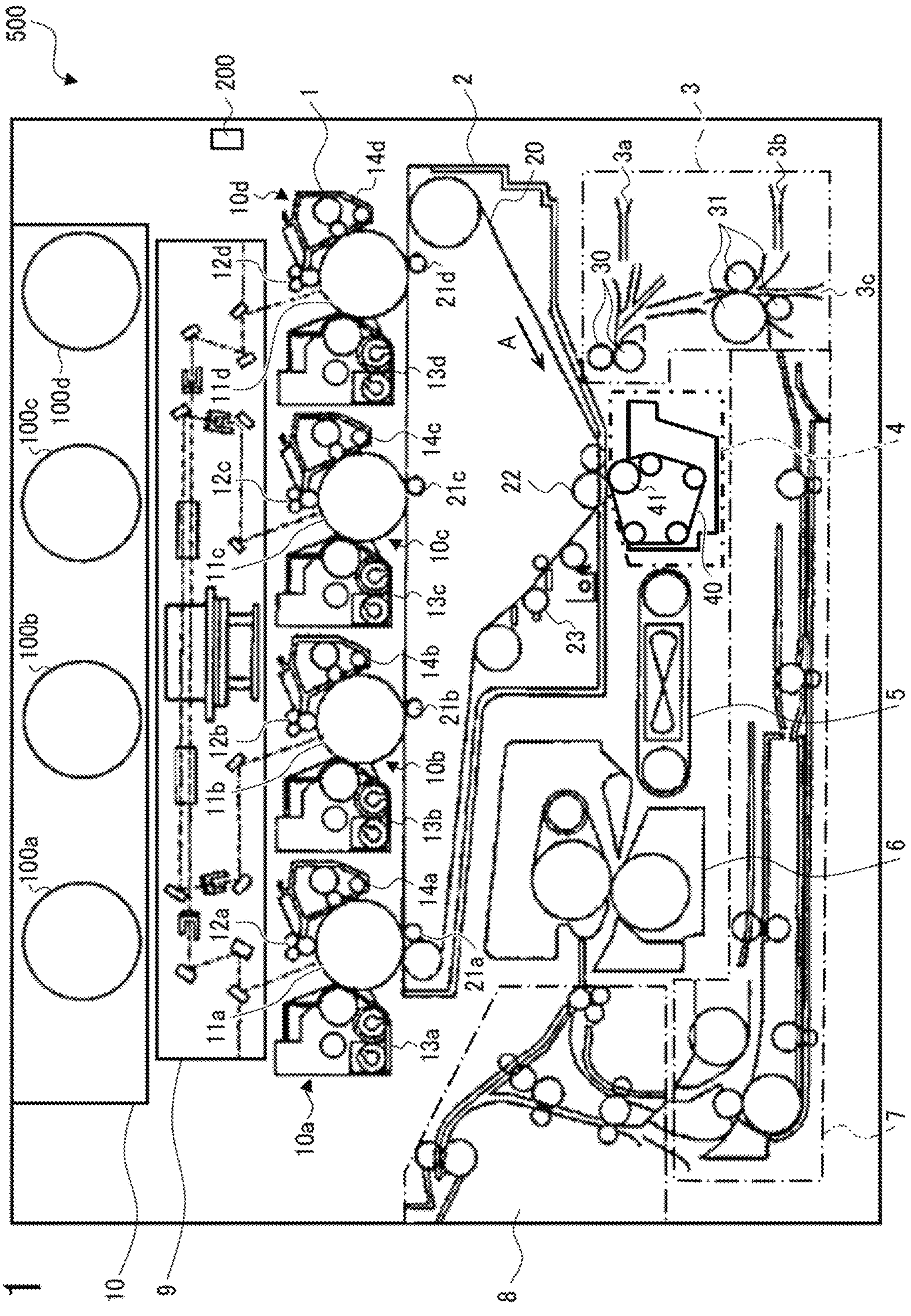
FIG. 1 is a schematic diagram illustrating a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

For the sake of simplicity, like reference numerals are given to identical or corresponding constituent elements such as parts and materials having the same functions, and redundant descriptions thereof are omitted unless otherwise required.

As used herein, the term "connected/coupled" includes both direct connections and connections in which there are one or more intermediate connecting elements.

Initially, with reference to FIG. 1, a description is given of the overall configuration of an image forming apparatus according to an embodiment of the present disclosure.

FIG. 1 is a schematic diagram illustrating a configuration of an image forming apparatus according to an embodiment of the present disclosure.

The image forming apparatus that is illustrated in FIG. 1 is a printer that forms a toner image by electrophotography, transfers and fixes the toner image onto a recording medium such as a sheet of paper, and finally outputs the recording medium as a printed matter.

Specifically, the printer 500 serving as an image forming apparatus includes a toner-image forming device 1, a primary transfer device 2, a sheet supply device 3, a secondary transfer device 4, a conveyor belt device 5, a fixing device 6, a duplex conveyance device 7, a sheet ejection device 8, an exposure device 9, and a toner-bottle accommodation device 10. The toner-image forming device 1 serving as an image forming device includes a plurality of photoconductive developing stations 10*a*, 10*b*, 10*c*, and 10*d*.

The photoconductive developing stations 10*a*, 10*b*, 10*c*, and 10*d* are disposed along a moving direction of a primary transfer belt 20 described later. For example, the photoconductive developing station 10*a* forms a yellow (Y) toner image. The photoconductive developing station 10*b* forms a magenta (M) toner image. The photoconductive developing station 10*c* forms a cyan (C) toner image. The photoconductive developing station 10*d* forms a black (K) toner image.

The photoconductive developing stations 10*a*, 10*b*, 10*c*, and 10*d* respectively include drum-shaped photoconductors 11*a*, 11*b*, 11*c*, and 11*d* serving as image bearers, chargers 12*a*, 12*b*, 12*c*, and 12*d* that respectively charge the surfaces of the photoconductors 11*a*, 11*b*, 11*c*, and 11*d*, developing devices 13*a*, 13*b*, 13*c*, and 13*d* that respectively develop electrostatic latent images formed on the photoconductors 11*a*, 11*b*, 11*c*, and 11*d*, and cleaners 14*a*, 14*b*, 14*c*, and 14*d* that respectively clean the surfaces of the photoconductors 11*a*, 11*b*, 11*c*, and 11*d*.

The primary transfer device 2 serving as a first transfer device is disposed below the toner-image forming device 1. The primary transfer device 2 includes the primary transfer belt 20 serving as a first mover, primary transfer rollers 21*a*, 21*b*, 21*c*, and 21*d*, a secondary-transfer counter roller 22, and a primary-transfer belt cleaner 23.

The primary transfer belt 20 is an endless belt formed of a single layer or a plurality of layers of, for example, polyvinylidene fluoride (PVDF), ethylene-tetrafluoroethylene copolymer (ETFE), polyimide (PI), or polycarbonate (PC). The primary transfer belt 20 is entrained around the primary transfer rollers 21*a*, 21*b*, 21*c*, and 21*d*, the secondary-transfer counter roller 22, and a plurality of support rollers to move clockwise in a direction A in FIG. 1.

The primary transfer rollers 21*a*, 21*b*, 21*c*, and 21*d* face the photoconductors 11*a*, 11*b*, 11*c*, and 11*d*, respectively, via the primary transfer belt 20. In other words, the primary transfer rollers 21*a*, 21*b*, 21*c*, and 21*d* sandwich the primary transfer belt 20 together with the photoconductors 11*a*, 11*b*, 11*c*, and 11*d*, respectively. Thus, the primary transfer belt 20 contacts each of the photoconductors 11*a*, 11*b*, 11*c*, and 11*d* to form a primary transfer area, which may be referred to as a primary transfer nip, between the primary transfer belt 20 and each of the photoconductors 11*a*, 11*b*, 11*c*, and 11*d*. The primary transfer area forms a primary transfer electric field between each of the primary transfer rollers 21*a*, 21*b*, 21*c*, and 21*d* and the corresponding one of the photoconductors 11*a*, 11*b*, 11*c*, and 11*d* to electrostatically move the toner image from the surface of each of the photoconductors 11*a*, 11*b*, 11*c*, and 11*d* to the primary transfer belt 20. As the primary transfer belt 20 receives the toner image from each of the photoconductors 11*a*, 11*b*, 11*c*, and 11*d* at the position where the primary transfer belt 20 contacts each of the photoconductors 11*a*, 11*b*, 11*c*, and 11*d*, the primary transfer belt 20 moves in the direction A to convey the toner image toward the secondary-transfer counter roller 22.

The secondary-transfer counter roller 22 forms a secondary transfer area, which may be referred to as a secondary transfer nip, together with a secondary transfer roller 41 described later.

The primary-transfer belt cleaner 23 is disposed downstream from the secondary-transfer counter roller 22 in the moving direction of the primary transfer belt 20 to clean the surface of the primary transfer belt 20 that has passed by the secondary-transfer counter roller 22.

The sheet supply device 3 is disposed below the primary transfer device 2. The sheet supply device 3 includes a conveyance roller pair 30 and a conveyance roller unit 31 to convey recording media separated and fed one by one from a sheet storage to the secondary transfer device 4. The sheet storage is coupled to the body of the printer 500 so as to communicate with sheet conveyance passages 3*a*, 3*b*, and 3*c* of the sheet supply device 3.

The secondary transfer device 4 serving as a second transfer device is disposed below the primary transfer device 2. The secondary transfer device 4 includes, for example, a secondary transfer belt 40 serving as a second mover and the secondary transfer roller 41.

The secondary transfer belt 40 is an endless belt formed of a single layer or a plurality of layers of, for example, PVDF, ETFE, PI, or PC. The secondary transfer belt 40 is entrained around the secondary transfer roller 41 and a plurality of support rollers to move counterclockwise in FIG. 1. The secondary transfer belt 40 conveys the recording medium fed from the conveyance roller pair 30. The secondary transfer belt 40 also transfers the toner image from the primary transfer belt 20 onto the recording medium at the secondary transfer area where the secondary transfer roller 41 and the secondary-transfer counter roller 22 face each other. A detailed description of the secondary transfer device 4 is deferred.

The conveyor belt device 5 is disposed below the primary transfer device 2. The conveyor belt device 5 guides the recording medium that has passed by the secondary transfer device 4 to the fixing device 6.

The fixing device 6 is disposed below the primary transfer device 2. The fixing device 6 applies, for example, heat and pressure to the toner image transferred onto the recording medium by the secondary transfer device 4, to fix the toner image onto the recording medium.

The duplex conveyance device 7 is disposed below, for example, the secondary transfer device 4, the conveyor belt device 5, and the fixing device 6. When the printer 500 performs duplex printing, the recording medium bearing the fixed toner image passes through the duplex conveyance device 7 and is returned toward the conveyance roller unit 31.

The sheet ejection device 8 is disposed behind the fixing device 6, in other words, downstream from the fixing device 6 in a recording-medium conveyance direction in which the recording medium is conveyed. The sheet ejection device 8 conveys the recording medium sent out from the fixing device 6 toward the outside of the printer 500 or toward the duplex conveyance device 7.

The exposure device 9 is disposed above the toner-image forming device 1. Laser light that is emitted by a light source of the exposure device 9 is guided to the photoconductors 11*a*, 11*b*, 11*c*, and 11*d* via optical components such as lenses and mirrors, to form an electrostatic latent image on the surface of each of the photoconductors 11*a*, 11*b*, 11*c*, and 11*d*.

The toner-bottle accommodation device 10 is disposed above the exposure device 9. Toner bottles 100*a*, 100*d*, 100*c*, and 100*d* containing toner to be supplied to the developing devices 13*a*, 13*b*, 13*c*, and 13*d*, respectively, are detachably attached to the toner-bottle accommodation device 10.

In the configuration described above, when receiving image data from, for example, an external computer, the printer 500 starts a print job and starts driving, for example, the toner-image forming device 1, the primary transfer device 2, and the exposure device 9. In the toner-image forming device 1, the chargers 12*a*, 12*b*, 12*c*, and 12*d* uniformly charge the surfaces of the rotationally driven photoconductors 11*a*, 11*b*, 11*c*, and 11*d*, respectively, to a given charging potential. The exposure device 9 forms an electrostatic latent image on the charged surface of each of the photoconductors 11*a*, 11*b*, 11*c*, and 11*d*. The developing devices 13*a*, 13*b*, 13*c*, and 13*d* respectively develop the electrostatic latent images formed on the photoconductors 11*a*, 11*b*, 11*c*, and 11*d* as toner images. The toner images are then sequentially transferred onto the primary transfer belt 20. After the toner images are transferred, the cleaners 14*a*, 14*b*, 14*c*, and 14*d* clean the surfaces of the photoconductors 11*a*, 11*b*, 11*c*, and 11*d*, respectively.

In parallel with the toner image formation described above, the sheet supply device 3 conveys the recording medium toward the conveyance roller pair 30. The conveyance roller pair 30 is a registration roller pair. When the recording medium abuts against the conveyance roller pair 30, the conveyance roller pair 30 temporarily stops the conveyance of the recording medium. The conveyance roller pair 30 resumes the conveyance of the recording medium so that the recording medium meets the toner image that has been transferred onto the primary transfer belt 20 and arrives at the secondary transfer nip. In other words, the recording medium whose conveyance is resumed meets the toner image on the primary transfer belt 20 at the secondary transfer nip, where the toner image is transferred onto the surface of the recording medium.

The conveyor belt device 5 conveys the recording medium bearing the transferred toner image to the fixing device 6. The fixing device 6 applies heat and pressure to the recording medium bearing the toner image to fix the toner image onto the recording medium.

After the toner image is fixed to the recording medium, the recording medium is conveyed to the sheet ejection device 8. In the sheet ejection device 8, for example, a direction switching claw switches the course of the recording medium to the outside of the printer 500 or to the duplex conveyance device 7. When the recording medium is sent from the sheet ejection device 8 to the duplex conveyance device 7, the recording medium is sent again to the secondary transfer nip, where another toner image is formed on the back side of the recording medium. Thereafter, the recording medium is finally ejected from the sheet ejection device 8. After the primary transfer belt 20 passes through the secondary transfer nip, the primary-transfer belt cleaner 23 cleans the surface of the primary transfer belt 20 to remove the residue such as the toner from the surface of the primary transfer belt 20. The printer 500 includes a temperature-humidity sensor 200 that detects the temperature and humidity inside the body of the printer 500. The temperature and humidity information that is detected by the temperature-humidity sensor 200 is used to adjust image-forming conditions described later.

The numbers of, for example, the photoconductive developing stations 10*a*, 10*b*, 10*c*, and 10*d* and the toner bottles 100*a*, 100*b*, 100*c*, and 100*d* included in the printer 500 may increase or decrease as appropriate for the type and number of colors of the toner used in the printer 500.

The recording medium that is used for printing is not limited to a sheet of paper. Alternatively, for example, the recording medium may be made of fiber, fabric, leather, metal, plastic, glass, wood, or ceramics.

Figure 2:
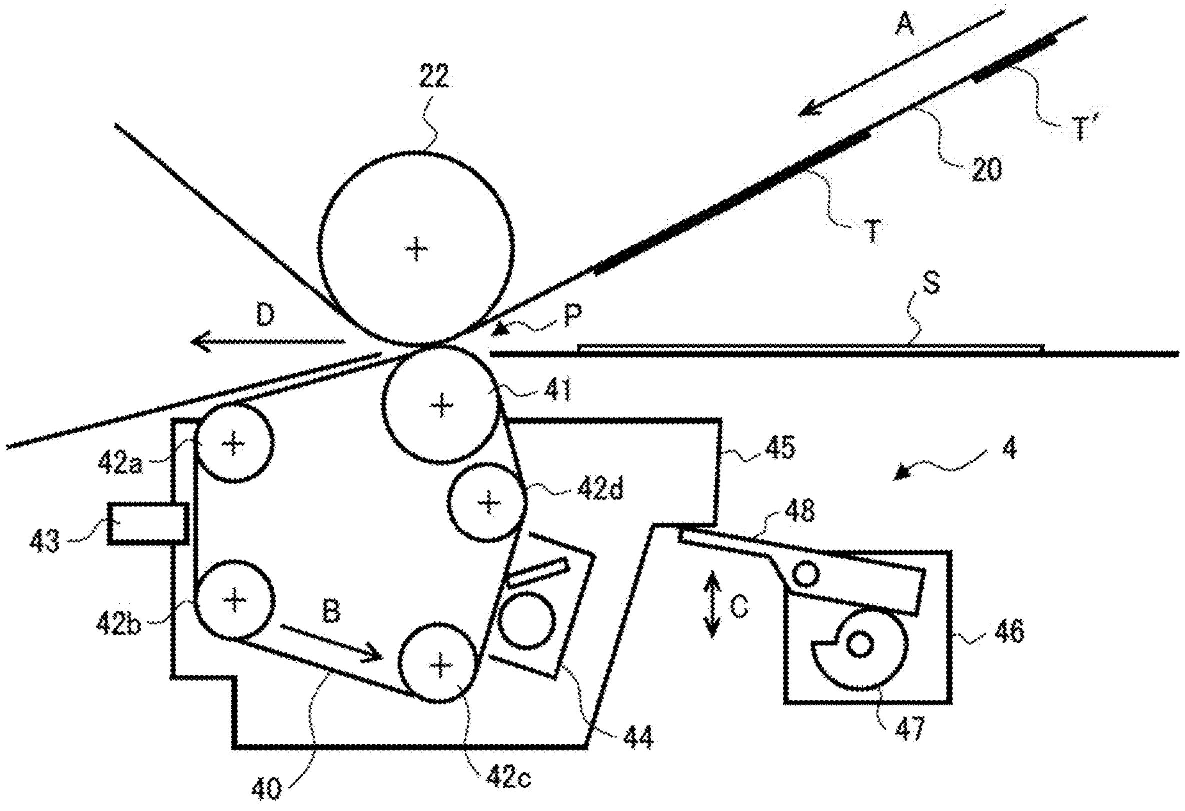
FIG. 2 is a diagram illustrating a configuration around a secondary transfer device included in the image forming apparatus of FIG. 1.

Referring now to FIG. 2, a description is given of a configuration around the secondary transfer device 4.

FIG. 2 is a diagram illustrating a configuration around the secondary transfer device 4, according to the present embodiment.

In addition to the secondary transfer belt 40 and the secondary transfer roller 41 illustrated in FIG. 1, the secondary transfer device 4 includes a plurality of support rollers 42*a*, 42*b*, 42*c*, and 42*d*, a density sensor 43 serving as an adhesion-amount detector, a secondary-transfer belt cleaner 44, and a frame 45 that holds the secondary transfer belt 40, the secondary transfer roller 41, the support rollers 42*a*, 42*b*, 42*c*, and 42*d*, the density sensor 43, and the secondary-transfer belt cleaner 44. The secondary transfer device 4 further includes a pressure applier 46 serving as a transfer-pressure changer.

The secondary transfer belt 40 is entrained around the secondary transfer roller 41 and the plurality of support rollers 42*a*, 42*b*, 42*c*, and 42*d* to move counterclockwise in a direction B in FIG. 2. The secondary transfer roller 41 sandwiches the secondary transfer belt 40 together with the primary transfer belt 20 facing the secondary transfer roller 41 to form the secondary transfer area, which may be referred to as a secondary transfer nip P in the following description, between the primary transfer belt 20 and the secondary transfer belt 40 facing each other. The secondary transfer nip P forms a secondary transfer electric field to electrostatically move a toner image T, which has been transferred onto the surface of the primary transfer belt 20, to a recording medium S conveyed to the secondary transfer nip P. On the other hand, the secondary transfer area P forms the secondary transfer electric field to electrostatically move a toner image T', which has been transferred onto the surface of the primary transfer belt 20, to the secondary transfer belt 40.

The density sensor 43 is disposed to face the surface of the secondary transfer belt 40. The density sensor 43 detects the amount of toner adhering to the secondary transfer belt when the toner image T' is transferred from the primary transfer belt 20 onto the secondary transfer belt 40. In the following description, the amount of toner adhering to the secondary transfer belt 40 may be referred to simply as the amount of adhered toner. The density sensor 43 includes a light-emitting device such as an infrared light emitting diode (LED) and a light-receiving device such as a phototransistor that receives reflected light and outputs an electric signal corresponding to the intensity of the light received. The configuration of the density sensor 43 is not limited to the aforementioned configuration provided that the density sensor 43 can detect the amount of adhered toner.

The secondary-transfer belt cleaner 44 is disposed downstream from the density sensor 43 in a moving direction of the secondary transfer belt 40 to clean the surface of the secondary transfer belt 40 that has passed by the density sensor 43.

The pressure applier 46 includes a cam 47 and an arm 48 that is supported so as to be swingable in a direction C with rotation of the cam 47. The pressure applier 46 is positioned to allow the arm 48 to contact part of the frame 45. The frame 45 is displaceable in the direction C depending on the position of the arm 48. In other words, the pressure applier 46 can change a transfer pressure, which is a pressure generated at the secondary transfer nip P.

At the secondary transfer nip P, the toner image T is transferred from the primary transfer belt 20 onto the recording medium S. The recording medium S is then conveyed in a direction D toward the fixing device 6, which fixes the toner image T onto the recording medium S. On the other hand, the toner image T' is not transferred onto the recording medium S at the secondary transfer nip P. Instead, the toner image T' is transferred onto the secondary transfer belt 40 in a sheet interval between the preceding recording medium and the succeeding recording medium. In short, no recording medium is present in the sheet interval. The toner image T' is, for example, a given test pattern image. The toner image T' is formed on the secondary transfer belt 40 and detected by the density sensor 43 for every given number of recording media S onto each of which the toner image T is transferred.

Figure 3B:
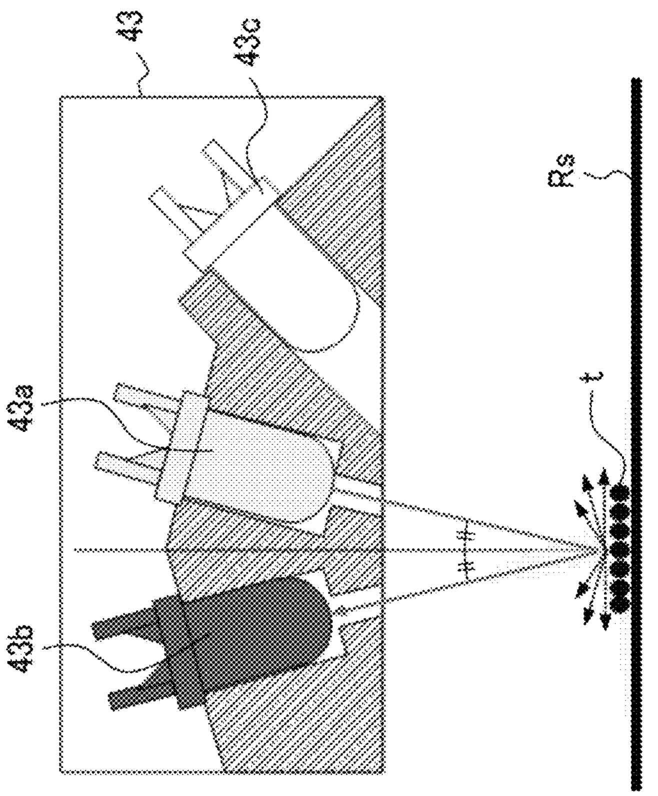
FIGS. 3A and 3B are diagrams each illustrating a density sensor included in the image forming apparatus of FIG. 1.
Figure 3A:
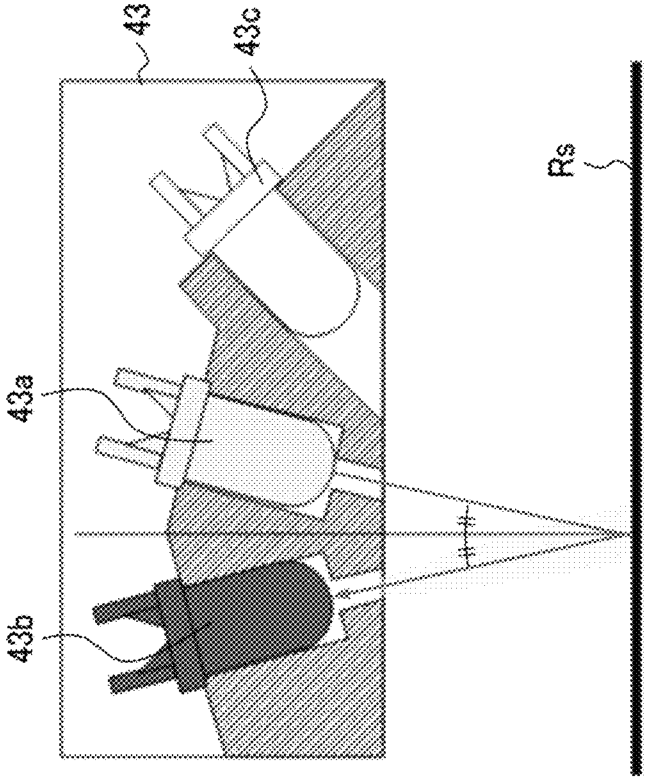

Referring now to FIGS. 3A and 3B, a description is given of a reason why the density sensor 43 is disposed in the secondary transfer device 4.

FIGS. 3A and 3B are diagrams each illustrating the density sensor 43 according to the present embodiment.

The density sensor 43 includes a light-emitting device 43*a*, a first light-receiving device 43*b*, and a second light-receiving device 43*c*. The light-emitting device 43*a* is, for example, an infrared LED. The first light-receiving device 43*b* receives specularly reflected light, which is light reflected at a reflection angle equal to an incident angle of light striking on a reflection surface Rs. The second light-receiving device 43*c* receives diffusely reflected light, which is light diffusely reflected by the reflection surface Rs.

In the present embodiment, the density sensor 43 detects the specularly reflected light with the first light-receiving device 43*b*. The reflection surface Rs is an elastic body.

FIG. 3A illustrates a case where no toner image is present on the reflection face Rs whereas FIG. 3B illustrates a case where a toner image t adheres on the reflection surface Rs. In the case that is illustrated in FIG. 3A, the light from the light-emitting device 43*a* is reflected in proportion to the specular glossiness of the surface of the elastic body. The first light-receiving device 43*b* detects the reflected light.

By contrast, in the case that is illustrated in FIG. 3B, the light from the light-emitting device 43*a* is scattered by the toner image t. In other words, the specularly reflected light decreases as the amount of adhered toner increases.

In particular, in a case where the toner image t is a black toner image, the light from the light-emitting device 43*a* is scattered or absorbed by the toner surface. In short, the specularly reflected light remarkably decreases.

When the amount of adhered toner is obtained based on the specularly reflected light detected by the first light-receiving device 43*b*, the amount of adhered toner can be obtained by the ratio between the smoothness of the reflection surface Rs and the roughness of the toner image t, in other words, the ratio in the specular glossiness between the reflection surface Rs and the toner image t. However, in a case where the reflection surface Rs is an elastic body, the reflection surface Rs is relatively rough, and thus the density sensor 43 hardly obtains the light specularly reflected from the reflection surface Rs. In short, the density sensor 43 may fail to correctly detect the amount of adhered toner.

In the printer 500 of the present embodiment, the primary transfer belt 20 is an elastic belt having an elastic layer at least on the surface of the primary transfer belt 20. If the amount of adhered toner is to be detected on the primary transfer belt 20, a density sensor may fail to correctly detect the amount of adhered toner. On the other hand, the secondary transfer belt 40 is made of a resin film having relatively high glossiness such as PI. For this reason, the density sensor 43 easily obtains the light specularly reflected from the reflection surface Rs. Thus, the ratio in the specular glossiness between the reflection surface Rs and the toner image t is easily obtained. Accordingly, in the present embodiment, the density sensor 43 is disposed in the secondary transfer device 4.

The secondary transfer device 4 includes the pressure applier 46 as illustrated in FIG. 2 to allow printing on various types of recording media (for example, sheets in different thicknesses or surface roughness). In the secondary transfer device 4, the pressure applier 46 sets the transfer pressure at the secondary transfer nip P as appropriate for the type of the recording medium S and transfers the toner image T onto the recording medium S.

On the other hand, since the toner image T' that is formed as a test pattern image is transferred onto the secondary transfer belt 40 in the sheet interval, the toner image T' is to be transferred onto the secondary transfer belt 40 at a constant transfer pressure regardless of the type of the recording medium S that is used for printing.

However, in typical printers, the toner image T', which may be referred to as a test pattern image T' in the following description, is transferred onto a secondary transfer belt at the same transfer pressure as the transfer pressure at which the toner image T is transferred onto the recording medium S. This is because the switching operation of the transfer pressure in the sheet interval does not catch up with the printing speed and lowers the productivity of the printed matter. For this reason, the test pattern image T' is transferred onto the secondary transfer belt at the same transfer pressure as the transfer pressure at which the toner image T is transferred onto the recording medium S.

As a result, the transfer rate of the test pattern image T' onto the secondary transfer belt decreases. The amount of adhered toner that is calculated based on the detection value output from the density sensor 43 also indicates a value lower than the actual amount of adhered toner. In short, typical printers have some difficulties in optimizing the image-forming conditions. In other words, typical printers have some difficulties in keeping the density of the toner images stable during continuous printing. For this reason, the image quality decreases.

By contrast, the printer 500 according to the present embodiment estimates a variable value for the amount of adhered toner of the test pattern image T' that varies with a change in the transfer pressure at the secondary transfer nip P. Based on the estimated variable value, the printer 500 corrects the detection value output from the density sensor 43. Based on the corrected detection value, the printer 500 adjusts the image-forming conditions. Accordingly, the detection of the amount of adhered toner on the secondary transfer belt 40 is not affected by the change in the transfer pressure at the secondary transfer nip P, allowing the printer 500 to keep the density of the toner images stable during continuous printing.

Figure 4A:
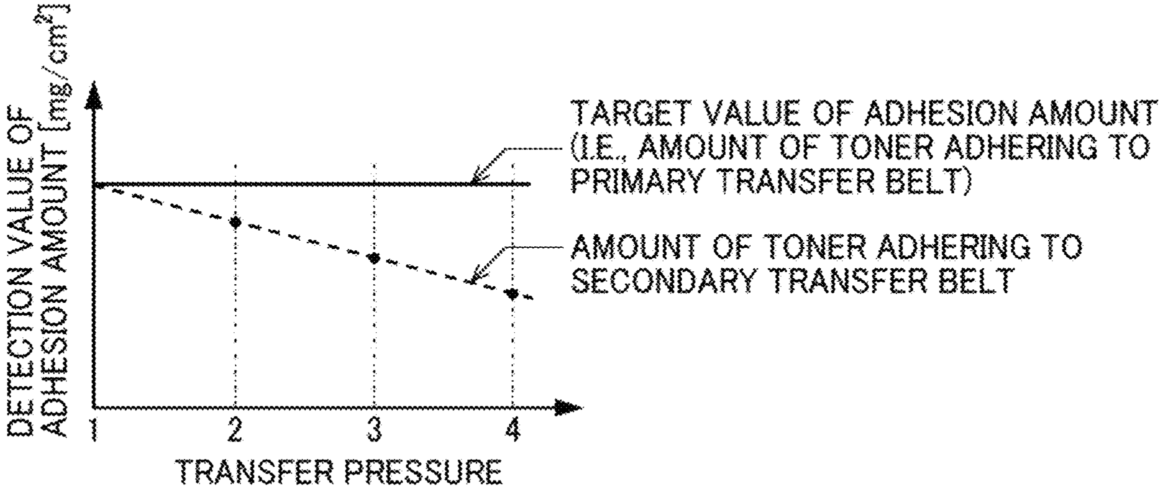
FIGS. 4A and 4B are graphs each illustrating the relation between transfer pressure and a detected amount of adhered toner, according to an embodiment of the present disclosure.
Figure 4B:
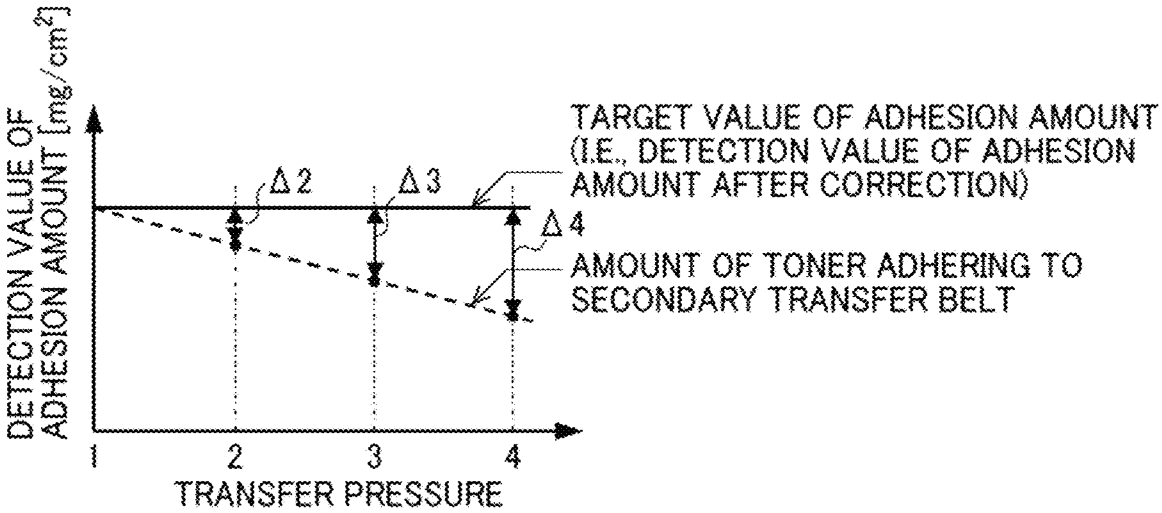

Referring now to FIGS. 4A and 4B, a description is given of the relation between the transfer pressure and the detected amount of adhered toner. The detected amount of adhered toner is a detected amount of toner adhering to the secondary transfer belt 40 and may be referred to as a detection value that indicates the amount of adhered toner in the following description.

FIGS. 4A and 4B are graphs each illustrating the relation between the transfer pressure and the detected amount of adhered toner.

Specifically, FIG. 4A is a graph according to a comparative example whereas FIG. 4B is a graph according to the present embodiment. As illustrated in FIGS. 4A and 4B, the transfer pressure at the secondary transfer nip P is set in four levels of 1 to 4. As the number increases, the transfer pressure increases. The optimum transfer pressure against the secondary transfer belt 40 is at level 1.

In FIG. 4A, as the transfer pressure increases from level 1, the transfer rate of the toner image T' (i.e., test pattern image) from the primary transfer belt 20 to the secondary transfer belt 40 decreases. For this reason, the detection value that indicates the amount of adhered toner calculated based on the detection value output from the density sensor 43 also decreases as indicated by the broken line. In other words, FIG. 4A illustrates a relation satisfying "the target value of the amount of adhered toner>the detection value that indicates the amount of adhered toner."

In the comparative example, the toner images T and T' are formed on the primary transfer belt 20 with the values indicated by the broken line being regarded as correct values. As a result, the image density varies among the toner images formed at, for example, the transfer pressure level 4.

On the other hand, in FIG. 4B according to the present embodiment, the variable values for the amount of adhered toner corresponding to the transfer pressure levels 2 to 4 are indicated by Δ2, Δ3, and Δ4. Each variable value at the corresponding one of the transfer pressure levels 1 to 4 may be expressed as "the variable value for the amount of adhered toner (Δn)=the target value of the amount of adhered toner—the detection value that indicates the amount of adhered toner," where n=1 to 4. Since the variable value for the amount of adhered toner at each of the transfer pressure levels 1 to 4 may be considered as a correction value or a correction amount, the detection value that indicates the amount of adhered toner after correction may be expressed as "the detection value that indicates the amount of adhered toner after correction=the target value of the amount of adhered toner=the detection value that indicates the amount of adhered toner+the variable value for the amount of adhered toner." In the following description, the detection value that indicates the amount of adhered toner after correction may be referred to simply as a corrected detection value.

In the following description, the target value of the amount of adhered toner of the test pattern image T' may be referred to as a target value M. The detection value that indicates the amount of adhered toner may be referred to as a detection value Mn. The detection value Mn based on the test pattern image T' differs between the transfer pressure levels. When the pressure values at the transfer pressure levels 1, 2, 3, and 4 are represented by T1, T2, T3, and T4, respectively, the actual detection values that indicate the amounts of toner of the test pattern image T' adhering to the secondary transfer belt 40 at the transfer pressure levels 1, 2, 3, and 4 are respectively represented by M1, M2, M3, and M4 (≠M). The difference between the target value M and the actual detection values M1, M2, M3, and M4, in other words, the variable values Δ1, Δ2, Δ3, and Δ4 at the transfer pressure levels 1, 2, 3, and 4 may be expressed as Δ1=M−M1, Δ2=M−M2, Δ3=M−M3, and Δ4=M−M4, respectively.

In the comparative example, the density sensor 43 detects the detection values M1 to M4 (≠M) that vary depending on the pressure values T1 to T4 at the transfer pressure levels 1 to 4, respectively. The image-forming conditions are adjusted so that the detection values M1 to M4 get close to the target value M. By contrast, in the present embodiment, the variable values Δ1 to Δ4 are estimated for the detection values M1 to M4 to correct the detection values M1 to M4 based on the variable values Δ1 to Δ4. The corrected detection values M1+Δ1, M2+Δ2, M3+Δ3, and M4+Δ4, each corresponding to the target value, are set as the detection values that indicate the amounts of adhered toner at the transfer pressure levels 1, 2, 3, and 4, respectively. The image-forming conditions are adjusted so as to get close to the corrected detection values reflecting the variable values for the amount of adhered toner. Accordingly, in the printer 500 according to the present embodiment, a stable amount of toner of the test pattern image T' adheres to the secondary transfer belt 40 during continuous printing regardless of the transfer pressure.

In the configuration described above according to the present embodiment, the detection value that indicates the amount of adhered toner decreases as the transfer pressure increases. In an alternative configuration, the detection value that indicates the amount of adhered toner may increase as the transfer pressure increases. The relation between the transfer pressure and the detection value that indicates the amount of adhered toner may vary depending on the combination of the materials of the primary transfer belt 20 and the secondary transfer belt 40. In the present embodiment, the primary transfer belt 20 is an elastic belt whereas the secondary transfer belt 40 is a PI film. In this case, the influences of minute gap discharge that is generated between the elastic belt and the toner image and between the PI film and the toner image tend to increase as the transfer pressure increases. Thus, the detection value that indicates the amount of adhered toner may decrease as the transfer pressure increases.

Figure 5:
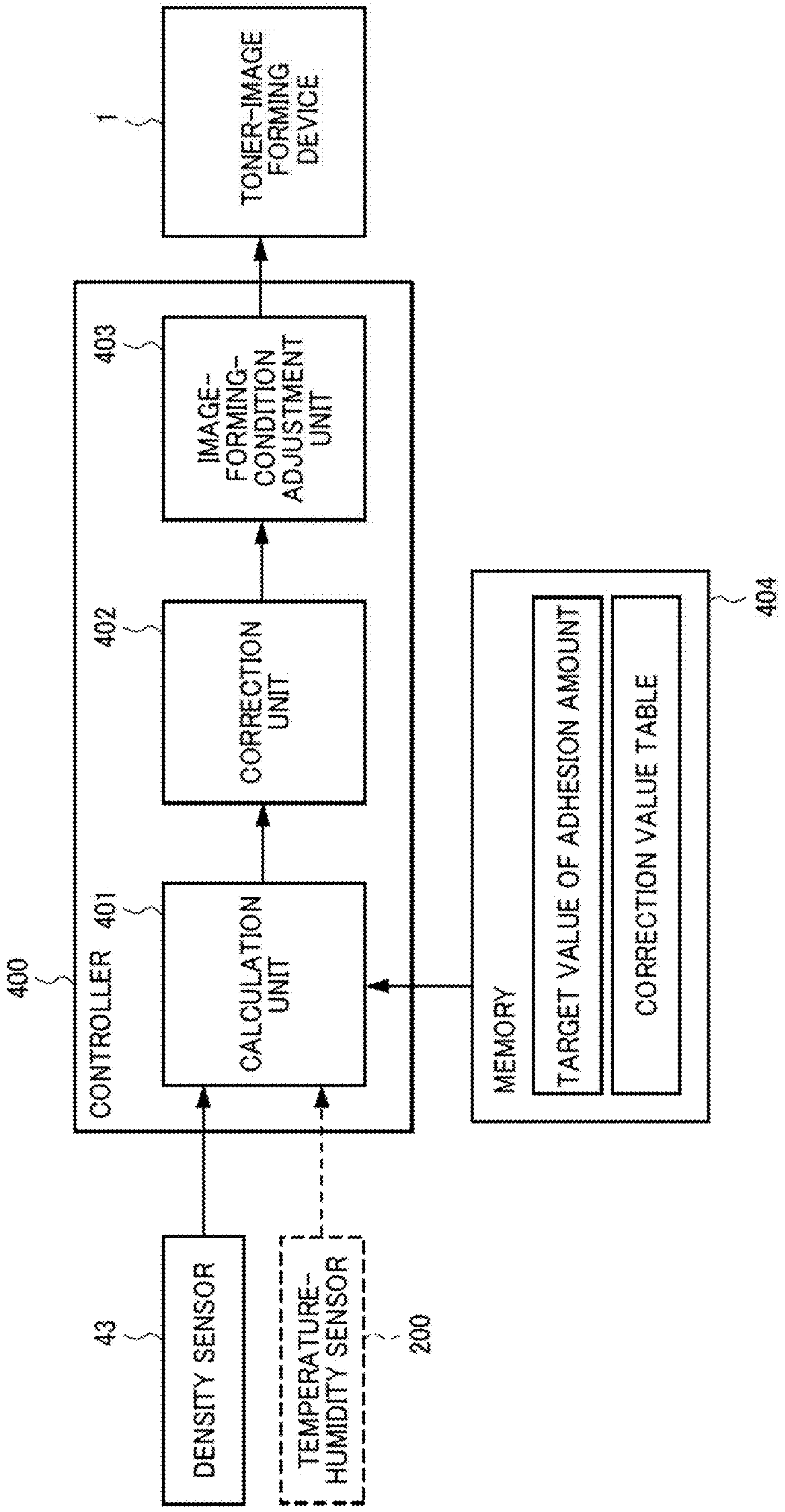
FIG. 5 is a block diagram of elements related to the adjustment of image-forming conditions, according to an embodiment of the present disclosure.
Figure 6:
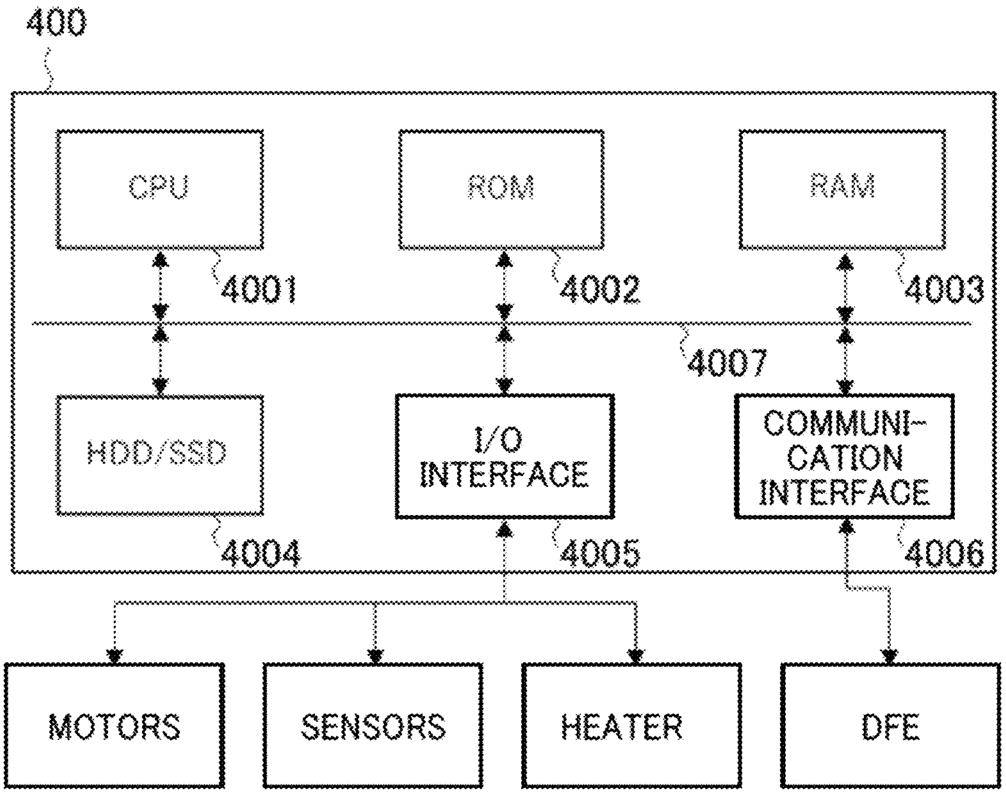
FIG. 6 is a block diagram illustrating a hardware configuration of a controller according to an embodiment of the present disclosure.
Figure 7:
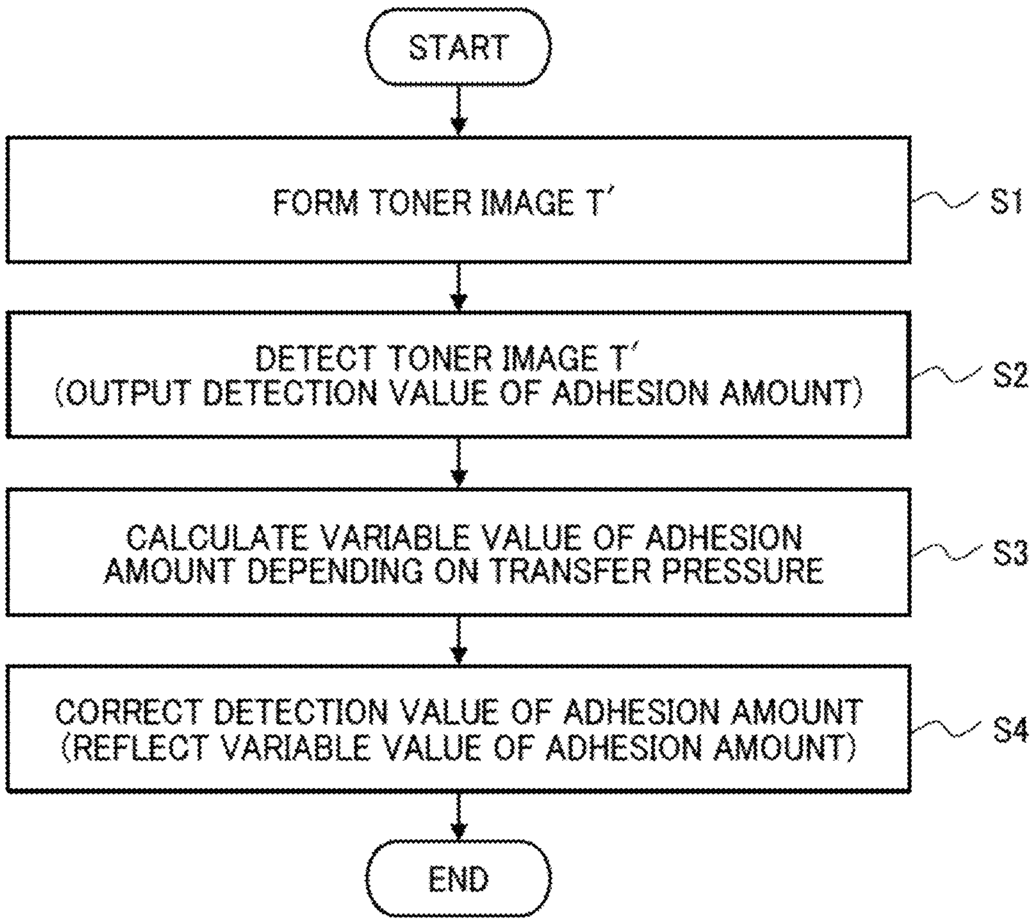
FIG. 7 is a flowchart of a process to correct a detection value that indicates the amount of adhered toner, according to an embodiment of the present disclosure.

Referring now to FIGS. 5 to 7, a description is given of operation and processing according to an embodiment of the present disclosure.

FIG. 5 is a block diagram of elements related to the adjustment of the image-forming conditions, according to the present embodiment.

FIG. 6 is a block diagram illustrating a hardware configuration of a controller 400 according to the present embodiment.

FIG. 7 is a flowchart of a process to correct the detection value that indicates the amount of adhered toner, according to the present embodiment.

In FIG. 5, the controller 400 includes a calculation unit 401, a correction unit 402, and an image-forming-condition adjustment unit 403.

The density sensor 43 and a memory 404 are connected to the calculation unit 401. Based on the target value of the amount of adhered toner stored in the memory 404 and the detection value that indicates the amount of adhered toner provided by the density sensor 43, the calculation unit 401 calculates the variable value for the amount of toner of the toner image T' adhering to the secondary transfer belt 40 that varies with the change in the transfer pressure. In addition to the density sensor 43, the temperature-humidity sensor 200 that detects the temperature and humidity inside the body of the printer 500 may be connected to the calculation unit 401. By acquiring the temperature and humidity information inside the body of the printer 500, the calculation unit 401 more appropriately calculates the variable value for the amount of adhered toner.

The correction unit 402 reflects (for example, adds) the variable value for the amount of adhered toner calculated by the calculation unit 401 in the detection value that indicates the amount of adhered toner, thus correcting the detection value that indicates the amount of adhered toner.

The image-forming-condition adjustment unit 403 adjusts the image-forming conditions for the toner-image forming device 1, based on the detection value that indicates the amount of adhered toner after correction, in other words, the detection value that indicates the amount of adhered toner corrected by the correction unit 402.

The memory 404 stores information that is used by the calculation unit 401 to calculate the variable value for the amount of adhered toner. For example, the memory 404 stores a correction value table storing information on the type such as the thickness and surface roughness of the recording medium S in addition to the target value of the amount of adhered toner. In a case where the temperature-humidity sensor 200 is connected to the calculation unit 401, the correction value table may be a table taking the temperature and humidity information into consideration. For example, the table may indicate that the correction value of the amount of adhered toner is greater in the correction amount for a high-temperature and high-humidity environment than for a normal-temperature and normal-humidity environment. The memory 404 may be disposed inside the controller 400.

Referring now to FIG. 6, a description is given of the hardware configuration of the controller 400.

Components may be optionally added to or removed from the hardware configuration illustrated in FIG. 6.

The controller 400 includes a central processing unit (CPU) 4001, a read only memory (ROM) 4002, a random access memory (RAM) 4003, a hard disk drive (HDD)/solid state drive (SSD) 4004, an input/output (I/O) interface 4005, a communication interface 4006, and a bus line 4007.

The CPU 4001 controls the entire printer 500 serving as an image forming apparatus. The CPU 4001 is an arithmetic device that reads programs or data stored in the ROM 4002 onto the RAM 4003 and execute processing to implement the functions of the printer 500.

The ROM 4002 is a nonvolatile memory that retains the programs or data even when the power is turned off. The RAM 4003 is a volatile memory that is used as, for example, a work area for the CPU 4001. The HDD/SSD 4004 controls reading or writing of various kinds of data under the control of the CPU 4001. The above-described functions of the memory 404 is implemented by the HDD/SSD 4004.

The I/O interface 4005 is an interface in which data are sent from internal logic to external sources and from which data are received from external sources. Examples of the external sources include, but are not limited to, motors and sensors such as the density sensor 43 and the temperature-humidity sensor 200 included in the printer 500 and the heater of the fixing device 6.

The communication interface 4006 is an interface that performs communication (connection) with a device that performs data processing to input data to the printer 500, such as a digital front end (DFE), via a communication network.

The bus line 4007 is, for example, an address bus or a data bus to electrically connect the components described above and transmit, for example, address signals, data signals, and various control signals. The CPU 4001, ROM 4002, RAM 4003, HDD/SSD 4004, I/O interface 4005, and the communication interface 4006 are connected with each other via the bus line 4007.

In the configuration described above, the printer 500 performs a process illustrated in FIG. 7 to adjust the image-forming conditions of the printer 500 based on the toner image T' (i.e., test pattern image). Specifically, in step S1, the printer 500 forms the toner image T' with, for example, the toner-image forming device 1.

The toner image T' that is thus formed in step S1 is transferred onto the secondary transfer belt 40 through the primary transfer and the secondary transfer and passes immediately below the density sensor 43. At this time, in step S2, the density sensor 43 detects the toner image T' passing immediately below the density sensor 43 and outputs the detection value that indicates the amount of adhered toner to the calculation unit 401.

Subsequently, in step S3, the calculation unit 401 calculates the variable value for the amount of adhered toner based on the detection value that indicates the amount of adhered toner provided by the density sensor 43 and the transfer pressure at that time. For example, when the toner image T' is secondarily transferred onto the secondary transfer belt 40 at an inappropriate transfer pressure, a difference between the target value of the amount of adhered toner and the detection value that indicates the amount of adhered toner is calculated as the variable value for the amount of adhered toner at the transfer pressure.

Subsequently, in step S4, the controller reflects (adds, in the present embodiment) the variable value for the amount of adhered toner thus calculated in step S3 in the detection value that indicates the amount of adhered toner, thus correcting the detection value that indicates the amount of adhered toner. The corrected detection value that is thus obtained in step S4 is notified to, for example, the toner-image forming device 1 via the image-forming-condition adjustment unit 403. The toner-image forming device 1 regards the notified detection value that indicates the amount of adhered toner as a correct value. The image-forming-condition adjustment unit 403 adjusts the image-forming conditions to keep the image density stable.

As described above, according to the present embodiment, the printer 500 includes the toner-image forming device 1, the primary transfer device 2, the secondary transfer device 4, the pressure applier 46, the density sensor 43, and the controller 400. The toner-image forming device 1 includes the photoconductors 11*a*, 11*b*, 11*c*, and 11*d* to form the toner image T' on each of the photoconductors 11*a*, 11*b*, 11*c*, and 11*d*. The primary transfer device 2 includes the primary transfer belt 20 to transfer the toner image T' from each of the photoconductors 11$a$, 11$b$, 11$c$, and 11$d$ onto the primary transfer belt 20. The secondary transfer device 4 includes the secondary transfer belt 40 to transfer the toner image T' from the primary transfer belt 20 onto the secondary transfer belt 40. The pressure applier 46 changes a transfer pressure of the secondary transfer belt 40 against the primary transfer belt 20. The density sensor 43 detects the toner image T' transferred onto the secondary transfer belt 40 and outputs the detection value that indicates the amount of adhered toner, which is a detection value that indicates the amount of toner of the toner image T' adhering to the secondary transfer belt 40. The controller 400 sets an image-forming condition of the toner image T' in the toner-image forming device 1 based on the detection value. The controller 400 includes the calculation unit 401, the correction unit 402, and the image-forming-condition adjustment unit 403. The calculation unit 401 calculates the variable value for the amount of toner of the toner image T' adhering to the secondary transfer belt 40, based on the detection value and the target value of the amount of adhered toner, which is a target value of the amount of toner of the toner image T' to be transferred and adhere to the secondary transfer belt 40. The variable value for the amount of toner of the toner image T' adhering to the secondary transfer belt 40 is a variable value for the amount of toner of the toner image T' adhering to the secondary transfer belt 40. The variable value varies with a change in the transfer pressure. The correction unit 402 reflects the variable value calculated by the calculation unit 401 in the detection value to correct the detection value. The image-forming-condition adjustment unit 403 adjusts the image-forming condition based on the detection value corrected by the correction unit 402.

Thus, the printer 500 adjusts the image-forming condition based on the detection value corrected to be a constant value regardless of the transfer pressure, to keep the image density stable.

According to one aspect of the present disclosure, the image forming apparatus acquires a stable image density regardless of the transfer pressure.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An image forming apparatus comprising:

an image forming device including an image bearer to form a toner image on the image bearer;

a first transfer device including a first mover to transfer the toner image from the image bearer onto the first mover;

a second transfer device including a second mover to transfer the toner image from the first mover onto the second mover;

a transfer-pressure changer configured to change a transfer pressure of the second mover against the first mover;

an adhesion-amount detector configured to detect the toner image transferred onto the second mover and output a detection value indicating an amount of toner of the toner image adhering to the second mover; and circuitry configured to calculate a variable value for the amount of toner of the toner image adhering to the second mover based on the detection value and a target value of the amount of toner of the toner image to be transferred and adhere to the second mover, the variable value varying with a change in the transfer pressure, reflect the calculated variable value in the detection value to correct the detection value, adjust an image-forming condition based on the corrected detection value, and set the image-forming condition of the toner image in the image forming device based on the corrected detection value.

2. The image forming apparatus according to claim 1, wherein the second transfer device is configured to transfer the toner image onto the second mover between recording media conveyed in the image forming apparatus.

3. The image forming apparatus according to claim 1, wherein the second transfer device is configured to transfer the toner image as a test pattern image onto the second mover.

4. The image forming apparatus according to claim 1, wherein the circuitry is configured to correct the variable value based on temperature and humidity in the image forming apparatus.

5. A method for forming an image, the method comprising:

forming a toner image on an image bearer of an image forming device;

transferring the toner image from the image bearer onto a first mover;

transferring the toner image from the first mover onto a second mover;

changing a transfer pressure of the second mover against the first mover;

detecting the toner image transferred onto the second mover and outputting a detection value indicating an amount of toner of the toner image adhering to the second mover; and setting an image-forming condition of the toner image in the image forming device based on the detection value, the setting including:

calculating a variable value for the amount of toner of the toner image adhering to the second mover based on the detection value and a target value of the amount of toner of the toner image to be transferred and adhere to the second mover, the variable value varying with a change in the transfer pressure;

reflecting the calculated variable value in the detection value to correct the detection value; and adjusting the image-forming condition based on the corrected detection value.

* * * * *